United States Patent
Silen

[11] 3,877,114
[45] Apr. 15, 1975

[54] STRAP GUIDING DEVICE
[76] Inventor: Tom Richard Silen, Bravallavagen 11 B, S-182 63 Djursholm, Sweden
[22] Filed: May 30, 1974
[21] Appl. No.: 474,411

[30] Foreign Application Priority Data
June 13, 1973 Sweden.............................. 7308343

[52] U.S. Cl........... 24/163 R; 280/150 SB; 297/389
[51] Int. Cl... A44b 11/00; A62b 35/00; B60r 21/10
[58] Field of Search....... 280/150 SB; 297/388, 389; 24/163 R, 182, 193, 197

[56] References Cited
UNITED STATES PATENTS
2,814,504 11/1957 Campbell et al.................... 297/388
3,719,972 3/1973 Klink .................................. 24/193
FOREIGN PATENTS OR APPLICATIONS
1,169,349 11/1969 United Kingdom................. 297/389
1,227,596 4/1971 United Kingdom.................. 24/197

Primary Examiner—Donald A. Griffin
Attorney, Agent, or Firm—Shlesinger, Fitzsimmons & Shlesinger

[57] ABSTRACT

A device to guide a safety belt of the reeling type in a vehicle so that the strap when effected will maintain its original right side up position and will not be twisted or distorted. A hoop is pivotally connected by fastener [9] to a divert element [3] through which the belt [2] can run freely and serves as a guide so that the belt which passes thru both the hoop and divert element will always run right side up, but when pulled in a certain direction will be able to turn in order to align to the mentioned direction of pulling.

7 Claims, 2 Drawing Figures

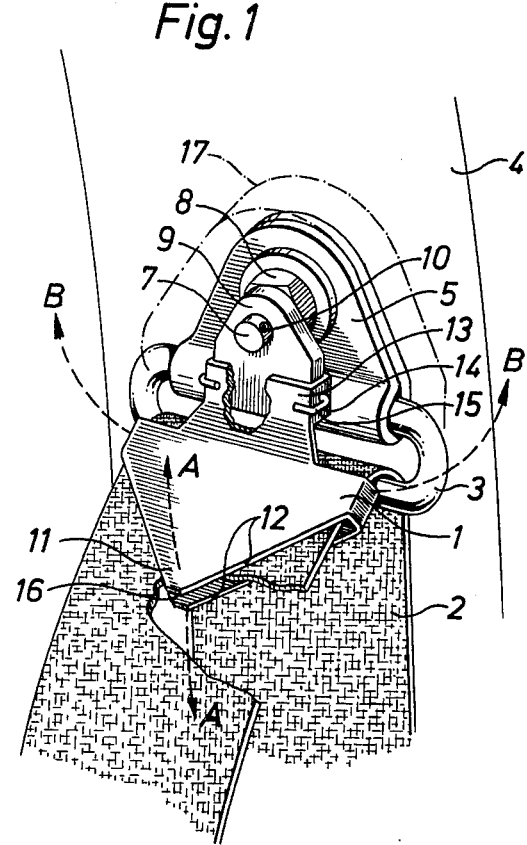
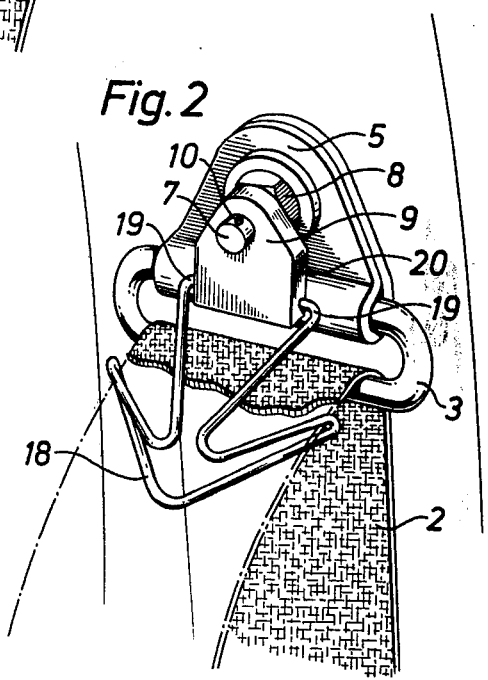

STRAP GUIDING DEVICE

This invention refers to a device to guide a strap, for example a safety belt of the reeling type in a vehicle, so that the strap when operated will maintain its original right side up position and will not be twisted or distorted.

Those belts now being used in passenger cars are of the so-called reeling belt type. The reel itself is then normally attached in connection to the floor of the car and the belt runs up adjacent to a side wall of the car. Via a so-called divert element, that is an element through which the belt when operated by a pulling force can run freely, said belt then extends down to a mounting point disposed in connection to the middle part of the floor of the car. Thus, from the divert element the belt runs diagonally over the back of the corresponding seat. This is of most relevance when the belt is utilized in the front seat of a car. Generally the mentioned divert element is fastened by means of a bolt to that window upright separating the front side window from the rear one. When a person gets into the car and applies the belt said belt is fed from the reel and runs through the mentioned divert element. Since the belt is fed out right side up from the reel it will also run right side up through the divert element. However, it has been found that when the belt is refed to the reel it will have a tendency to twist or to distort. Then the belt may be doublefolded in the passage of the divert element or it may also be completely twisted. Sometimes the longitudinal axis of the divert element is not in parallel to the floor of the car and for this reason it may also happen that the belt is brought to one corner of the passage of the divert element. Then the belt can easily be distorted.

The object of the invention is to provide a device of the kind mentioned by the way of introduction whereby the disadvantages mentioned above in connection with the types of belt now existing will be eliminated. According to the invention this is provided by a strap guiding device including a hoop attached in direct connection to the divert element by a fastening part and having a through-passage for the strap, said hoop then exerting the guiding function so that the strap which will then pass through both the hoop and the divert element will always pass right side up but when pulled in a certain direction will be able to turn in order to align according to the mentioned direction of pulling.

The invention will be described below more in detail in connection with some preferred embodiments and with reference to the drawings.

FIG. 1 shows a belt guiding device made of plastic, designed according to the principles of the invention and mounted for use in connection with a safety belt.

FIG. 2 shows a belt guiding device made of metal wire, designed according to the principles of the invention and mounted for use in connection with a safety belt.

The same reference numerals are used in both FIGURES for the same elements.

The embodiments disclosed on the drawing refer to a belt guiding device in the form of a hoop 1 said device intended to be used in combination with a safety belt 2 of the reeling type. The divert element 3 then utilized is placed on the window upright 4 between the front and the rear side windows in a car. The divert element 3 itself is made by an oblong metal loop having a fastening device 5 which is steadily attached to the mentioned window upright 4 by a bolt 7. In the disclosed embodiment the fastening bolt 7 has a characteristic design. It extends a certain distance beyond the attaching nut 8 which is used to attach the mentioned fastening device 15 in regard to the window upright 4. The belt guiding hoop 1 includes a fastening element 9 which is applied over the fastening bolt 7 and locked by a locking pin 10 so that it cannot unintentionally be removed from the fastening bolt 7. By use of the mentioned arrangement the fastening element 9 and the belt guiding hoop 1 linked thereto can be turned or swung to the side and upwards.

The belt guiding hoop 1 disclosed in FIG. 1 is made of plastic. The passage of the hoop 1 for the strap 2, that is the belt, has a transversal opening width essentially corresponding to the width of the opening of the divert element 3. However, the height of the passage opening must be less than the thickness of a double-folded belt 2. By dimensioning the height of the passage opening in this way the belt 2 cannot be double-folded. The hoop 1 has a pointed design and the point 11 is remote from the fastening element 9 of the hoop and faces the lower part of the car. Those edges 12 of the passage opening facing inwardly are somewhat rounded so that the belt 1 can run into the passage at the lowest possible friction. As follows from the drawing the hoop 1 and the fastening element 9 thereof are flexibly connected. The upwards extending part 13 of the hoop 1 includes folded end parts 14 cooperating with the fastening pin 15 extending into the fastening element 9. By this it will then be possible to turn the hoop 1 upwards and downwards in a limited extension if the mutual fitting between the hoop 1 and the fastening element is dimensioned in a corresponding manner. This is indicated by arrows A. This possibility enabling movement to the sides and upwards as mentioned above is indicated by arrows B. As also follows from FIG. 1 the bottom wall 16 of the plastic hoop is divided in the middle. The intention is to make it possible to insert the belt 2 from the side into the hoop 1 through the dividing opening. In this manner the new strap guiding device can also be mounted in cars which were originally equipped with safety belts of the reeling type but not with the mentioned device. In connection with such a mounting only the bolt 7 for the fastening device 5 of the divert element 3 has to be replaced. Thus, the costs for mounting the new device can be kept low. The element disclosed by the broken line 17 in FIG. 1 refers to a cover which normally covers both the fastening device 5 and the fastening element 9. In connection with the embodiment according to FIG. 1 the cover should be made of the same plastic material as the hoop 1. The embodiment of the invention as disclosed in FIG. 2 refers to a hoop 18 which is made of metal wire. The function is the same as in connection with the embodiment according to FIG. 1. Thus, the hoop 18 of metal wire can be moved in various directions though this is not especially indicated by arrows in the same way as the hoop 1 of FIG. 1. The ends 19 of the hoop 18 of metal wire are bent and directly attached in recesses in the side edges 20 of the fastening element 9.

Though the invention has been described in connection with safety belts of the reeling type it is obvious that it may also be utilized in many other connections where straps of various kinds have a tendency to twist or to distort when effected. Of course modifications of the described devices can also be made within the scope of the invention. For example various known joint arrangements may be used to make it possible to turn the strap guiding device in various directions.

I claim:

1. A device to guide a strap (2), for example a safety belt of the reeling type in a vehicle, so that the strap when effected will maintain its original right side up position and will not be twisted or distorted, characterized in that it includes a hoop (1) attached in immediate connection to a divert element (3), that is an element through which the strap (2) can run freely, by means of a fastening element (9), and having a through-passage for the strap (2), said hoop (1) exerting the guiding function, so that the strap (2) which will thus pass through both the hoop (1) and the divert element (3) will always run right side up, but when pulled in a certain direction will be able to turn in order to align to the mentioned direction of pulling.

2. A device according to claim 1, characterized in that the transversal width of the opening of the through-passage essentially corresponds to the width of the opening of the divert element (3) and that the height of the through-passage is less than the thickness of a double-folded strap (2).

3. A device according to claim 1, characterized in that the hoop (1) has a pointed design so that the point (11) is remote from the fastening element (9) and faces that part of the strap (2) which normally tends to be twisted.

4. A device according to claim 1, characterized in that the fastening element (9) is so attached to the bolt (7) fixing the fastening device (5) of the divert element (3) in its place, that the fastening element (9) and then also the hoop (1) can be turned around the bolt (7).

5. A device according to claim 4, characterized in that the hoop (1) is so attached relative to the fastening element (9) that the hoop (1) can be turned along an axis transversal to the bolt axis said axis and said bolt axis then being in different planes.

6. A device according to claim 5, characterized in that the hoop (1) includes a metal wire (18) bent to the intended shape, the ends (9) of the wire being bent for attachment in corresponding recesses of the side edges (20) of the fastening element (9).

7. A device according to claim 5, characterized in that the hoop (1) is made of plastic and that it is so divided that the strap (2) can be inserted into the hoop (1) from the side through the thus formed dividing opening, whereby the hoop (1) can be connected to a safety belt of the reeling type already mounted in a vehicle.

* * * * *